United States Patent
Samie et al.

(10) Patent No.: US 8,196,724 B2
(45) Date of Patent: Jun. 12, 2012

(54) METHOD AND APPARATUS FOR CONTROLLING A SELECTABLE ONE-WAY CLUTCH IN AN ELECTRO-MECHANICAL TRANSMISSION

(75) Inventors: Farzad Samie, Franklin, MI (US); Alexander Millerman, Bloomfield Hills, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 622 days.

(21) Appl. No.: 12/365,155

(22) Filed: Feb. 3, 2009

(65) Prior Publication Data
US 2009/0194381 A1 Aug. 6, 2009

Related U.S. Application Data

(60) Provisional application No. 61/025,935, filed on Feb. 4, 2008.

(51) Int. Cl.
*F16D 41/16* (2006.01)
*F16D 27/108* (2006.01)
*F16D 27/118* (2006.01)

(52) U.S. Cl. .......... 192/43.1; 192/46; 192/47; 192/69.1; 192/84.92

(58) Field of Classification Search ................. 192/43.1, 192/47, 69.1, 84.92
See application file for complete search history.

(56) References Cited

U.S. PATENT DOCUMENTS

| | | | |
|---|---|---|---|
| 6,290,044 | B1 | 9/2001 | Burgman et al. |
| 6,905,009 | B2 * | 6/2005 | Reed et al. ................. 192/43.1 |
| 7,101,298 | B2 | 9/2006 | Sowul et al. |
| 7,220,200 | B2 | 5/2007 | Sowul et al. |
| 7,258,214 | B2 | 8/2007 | Pawley et al. |
| 2007/0056825 | A1 | 3/2007 | Fetting, Jr. et al. |
| 2007/0099738 | A1 | 5/2007 | Holmes |
| 2008/0169165 | A1 * | 7/2008 | Samie et al. ................. 192/43 |

FOREIGN PATENT DOCUMENTS

JP 2006077841 A1 3/2006
* cited by examiner

*Primary Examiner* — Rodney Bonck

(57) ABSTRACT

A selectable one-way clutch includes a strut plate co-annular to a slide plate and a notch plate. The selectable one-way clutch is configured to transfer torque between a strut plate and a notch plate in a first direction when a displacement actuator moves a pin and a slide plate to a first position. The selectable one-way clutch is configured to disengage the strut plate from the notch plate when the displacement actuator moves the pin and the slide plate to the second position.

4 Claims, 5 Drawing Sheets

METHOD AND APPARATUS FOR CONTROLLING A SELECTABLE ONE-WAY CLUTCH IN AN ELECTRO-MECHANICAL TRANSMISSION

CROSS REFERENCE TO RELATED APPLICATIONS

This application claims the benefit of U.S. Provisional Application No. 61/025,935 filed on 4 Feb. 2008 which is hereby incorporated herein by reference.

TECHNICAL FIELD

This disclosure is related to controlling two-mode continuously variable transmission systems.

BACKGROUND

The statements in this section merely provide background information related to the present disclosure and may not constitute prior art.

Known powertrain architectures include torque-generative devices, including internal combustion engines and torque machines that transfer torque through a transmission device to an output member. One exemplary powertrain includes a two-mode, compound-split, electromechanical transmission having an input member that receives tractive torque from a prime mover power source, preferably an internal combustion engine, and an output member. The output member can be operatively connected to a driveline for a motor vehicle for transferring tractive torque thereto. Torque machines, e.g., electric machines operative as motors or generators, generate torque inputs to the transmission independently of a torque input from the internal combustion engine. The torque machines may transform vehicle kinetic energy transferred through the vehicle driveline to potential energy that is storable in an energy storage device through a process referred to as regenerative braking. A control system monitors various inputs from the vehicle and the operator and provides operational control of the powertrain, including controlling transmission operating state and gear shifting, controlling the torque-generative devices, and regulating the power interchange among the energy storage device and the torque machines to manage outputs of the transmission, including torque and rotational speed.

Known two-mode hybrid transmissions can use differential gearing, torque transfer clutches, and the torque machines to transfer power to an output member that can be connected to a driveline when the powertrain is applied to a vehicle. Known transmission devices have spin losses that affect energy efficiency of the transmission and thus affect fuel economy.

Known selectable one-way clutch devices (SOWCs) can transfer torque between contiguous coaxial rotating devices when applied. Each of the contiguous rotating devices has a race. One race is oriented radially concentric to and opposing the race of the other rotating device. A multiplicity of controllable torque transferring devices, e.g., rollers, sprags, rockers or struts, are connected to one of the races and positioned to oppose the other race. The opposed race includes a multiplicity of surface receiving features corresponding to the controllable torque transferring devices. Known selectable one-way clutch devices are applied by controlling the controllable torque transferring devices to interact with and connect to the surface receiving features to lock rotations of the contiguous rotating devices to transfer torque therebetween. Known selectable one-way clutch devices can lock rotations of the contiguous rotating devices when rotating in a first direction. Thus, when one of the contiguous rotating devices rotates in the first direction, torque is transferred to the other contiguous rotating device. When the contiguous rotating device rotates in a second direction opposite to the first direction, no torque is transferred, permitting the rotating device to freewheel. A selectable one-way clutch device can include controllable torque transferring devices that can be controlled to a first position to interact with and connect to the surface receiving features to lock rotations of the contiguous rotating devices when rotating in one direction, and can also be controlled to a second position to interact with and connect to the surface receiving features to lock rotations of the contiguous rotating devices when rotating in the second direction opposite to the first direction. Known selectable one-way clutch devices can be controlled to another position to interact with and connect to the surface receiving features to lock rotations of the contiguous rotating devices when rotating in both the first direction and the second direction. Known selectable one-way clutch devices require substantially synchronous rotation of the contiguous rotating devices prior to applying the controllable torque transferring devices.

SUMMARY

A clutch assembly is configured to transfer torque in a transmission and includes a selectable one-way clutch having a strut plate co-annular to a slide plate and a notch plate. The strut plate includes a pass-through slot portion and an annular race. The slide plate is configured to slidably move in the annular race of the strut plate and includes a pin fixedly connected to and projecting from the slide plate and configured to pass through the slot portion of the strut plate, wherein the slidable movement of the slide plate is limited by the pin and the slot portion of the strut plate. A displacement actuator is fixedly connected to the strut plate and configured to selectively move the pin and the slide plate to one of a first position and a second position. The selectable one-way clutch is configured to transfer torque between the strut plate and the notch plate in a first direction when the pin and the slide plate are in the first position. The selectable one-way clutch is configured to disengage the strut plate from the notch plate when the pin and the slide plate are in the second position.

BRIEF DESCRIPTION OF THE DRAWINGS

One or more embodiments will now be described, by way of example, with reference to the accompanying drawings, in which.

DETAILED DESCRIPTION

Figure 1:
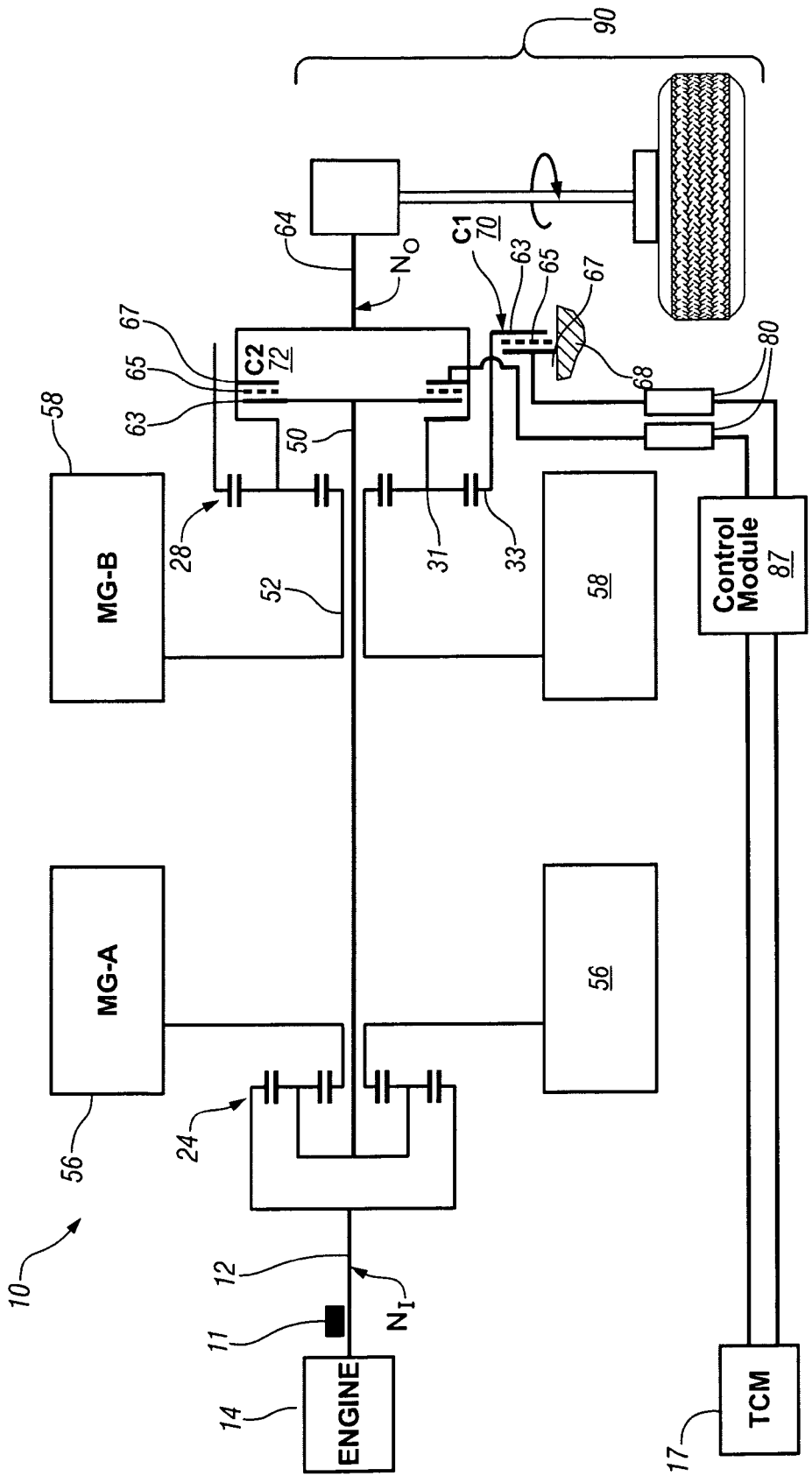
FIG. 1 is a block diagram of an exemplary transmission, in accordance with the present disclosure.

Referring now to the drawings, wherein the showings are for the purpose of illustrating certain exemplary embodiments only and not for the purpose of limiting the same, FIG. 1 schematically depicts a two-mode hybrid transmission 10 employing first and second selectable one-way clutches C1 70 and C2 72 to transfer torque in accordance with the present disclosure. Like reference numerals refer to like or similar components throughout the several figures.

The exemplary two-mode hybrid transmission 10 includes first and second differential gears 24 and 28 that comprise planetary gears in one embodiment. The hybrid transmission 10 includes an input member 12, an output member 64, first and second torque machines 56 and 58, and first and second clutch devices C1 70 and C2 72, all of which are mounted and configured to work together in a transmission case 68. In one embodiment the input member 12 couples to an output shaft from an internal combustion engine 14, and the output member 64 couples to a driveline 90 of a vehicle (not shown). The input member 12 is connected to an element of the first differential gear 24, in one embodiment comprising a ring gear. A shaft 50 connects to another element of the first differential gear 24, in one embodiment comprising a carrier gear set.

The exemplary two-mode hybrid transmission 10 operates in one of at least two continuously variable modes to transfer mechanical power between the input member 12, the first and second torque machines 56 and 58 and the output member 64. The hybrid transmission 10 operates in a first continuously variable mode by applying the first clutch device C1 70, transferring power between the second torque machine 58 and the output member 64. The hybrid transmission 10 operates a second continuously variable mode by applying the second clutch C2 72, transferring power between the input member 12, the first and second torque machines 56 and 58 and the output member 64. A transmission control module (TCM) 17 signally connects to a control module 87 to operate displacement actuators 80 to selectively engage and disengage the first and second clutch devices C1 70 and C2 72.

The first and second torque machines 56 and 58 comprise three-phase AC electric motor/generator machines in one embodiment, each including a stator and a rotor (not shown) and respective position sensing systems (not shown). The motor stators ground to an outer portion of the transmission case 68, and each includes a stator core with coiled electrical windings extending therefrom. The rotor for the first torque machine 56 is preferably supported on a hub plate gear that rotationally operatively connects to an input node comprising an element of the first differential gear set 24 and is shown as a sun gear in the embodiment. The rotor for the second electric machine 58 rotationally operatively connects via a sleeve shaft 52 to an input node comprising an element of the second differential gear set 28 and is shown as a sun gear in the embodiment. The shaft 50 and the sleeve shaft 52 are preferably coaxial. Alternatively, other torque machines, e.g., hydraulic-mechanical torque machines can be used. The first and second torque machines 56 and 58 each operate to generate power over a range of nominally positive and negative rotational speeds. The first and second torque machines 56 and 58 each transform stored energy to generate a tractive torque output that can be transferred to the transmission 10, ranging from a zero torque output to a maximum tractive torque capacity. The first and second torque machines 56 and 58 each operate to react tractive/braking torque input to the output member 64 of the hybrid transmission 10 to generate energy that can be stored in an energy storage device (not shown), ranging from zero to a maximum reactive torque capacity.

The first clutch C1 70 is operative to fixedly rotationally ground an element of the second differential gear set 28, in this embodiment a ring gear 33, to the transmission case 68 when the first clutch C1 70 is applied. The second clutch device C2 72 is operative to fixedly rotationally connect the rotor of the first torque machine 56 to the carrier gear set 31 of the second differential gear set 28 when the second clutch C2 72 is applied.

The first and second clutch devices C1 70 and C2 72 preferably comprise frictionless engagement clutches each selectively operative in an open state and selectively operative in an applied state. In one embodiment the frictionless engagement clutches comprise selectable one-way clutch devices including clutch elements comprising an annular strut plate 67 and a co-annular notch plate 63, with a co-annular slide plate 65 interposed therebetween. In one embodiment, the first and second clutch devices C1 70 and C2 72 comprise Type I selectable one-way clutch devices. Alternatively, the first and second clutch devices C1 70 and C2 72 can comprise Type II selectable one-way clutch devices. A Type I selectable one-way clutch (Type I SOWC) device transfers torque in a first direction without slipping when applied. A Type II selectable one-way clutch (Type II SOWC) device can transfer torque in a first direction without slipping when applied in a first position, and can transfer torque in a second, opposite direction when applied in a second position. Preferably, applying the SOWC clutch devices is effected only when rotational speeds of the clutch elements for the specific device are synchronized.

The Type I SOWC operates in one of three operating states, including a fully-open state and applied states comprising a one-way state and a fully-closed state. When the Type I SOWC is in the fully-open state, there is no coupling across the clutch elements and the clutch elements are free to rotate without transferring torque to the other element. When the Type I SOWC is applied in the one-way state, there is selective coupling across the clutch elements. Torque can be transferred across the clutch elements when rotating in a first direction, whereas no torque is transferred across the clutch elements when rotating in the second, opposite direction. When the Type I SOWC is applied in the fully-closed state, the clutch elements are fixedly connected and torque can be transferred across the clutch elements when rotating in either of the first direction and the second, opposite direction.

The Type II SOWC operates in one of four operating states, including a fully-open state and applied states comprising first and second one-way states and a fully-closed state. When the Type II SOWC is in the fully-open state, there is no coupling across the clutch elements, and both clutch elements are free to rotate without transferring torque to the other element. When the Type II SOWC is applied in the first one-way state, there is selective coupling across the clutch elements to transfer torque across the clutch elements when rotating in the first direction, whereas no torque is transferred across the clutch elements when rotating in the second, opposite direction. When the Type II SOWC is applied in the second one-way state, there is selective coupling across the clutch elements to transfer torque when rotating in the second, opposite direction, whereas no torque is transferred across the clutch elements when rotating in the first direction. When the Type II SOWC is applied in the fully-closed state, the clutch elements are fixedly connected and torque is transferred across the clutch elements when rotating in either the first or the second, opposite direction.

Figure 2:
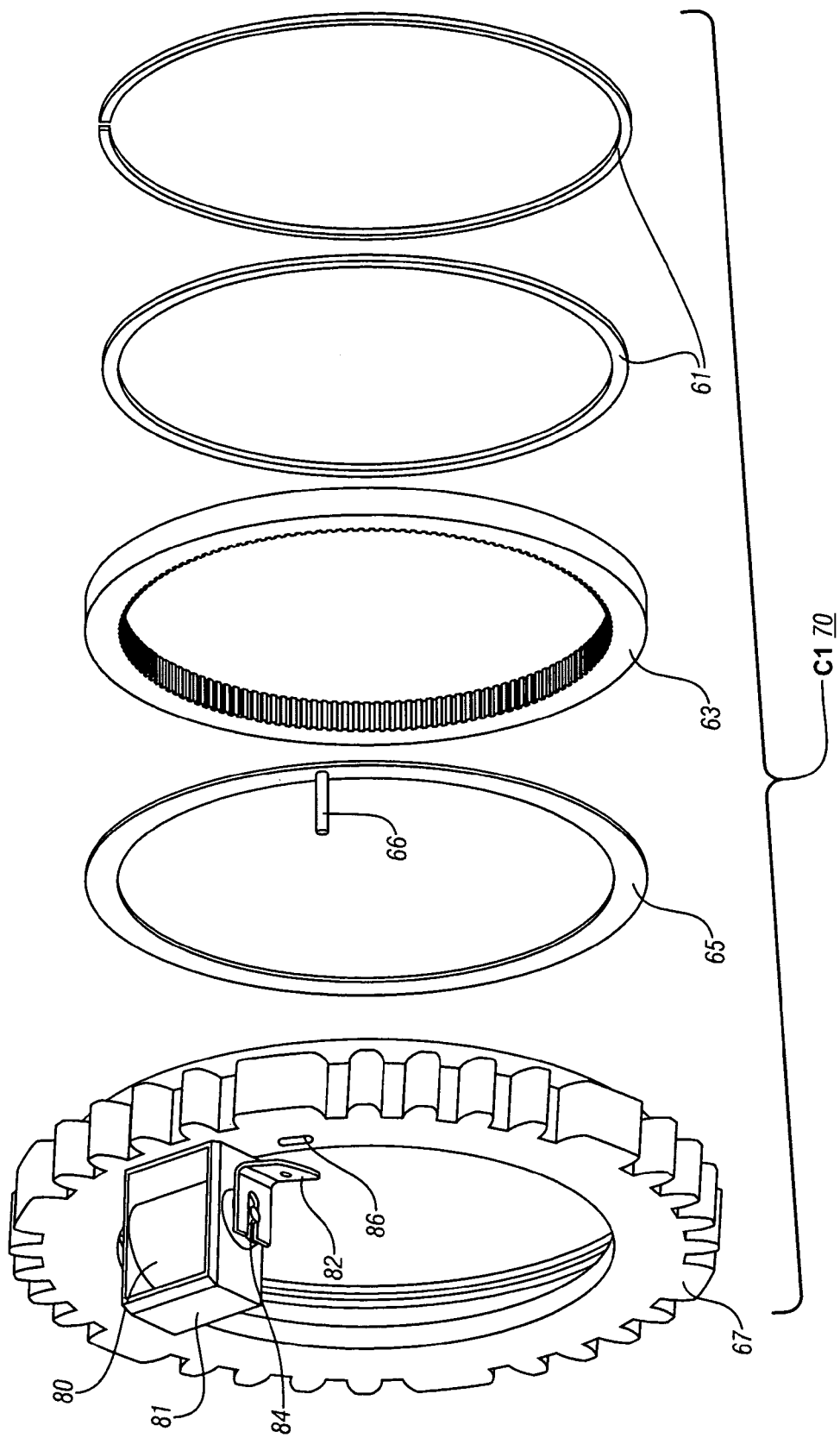
FIGS. 2, 3, and 4 illustrate disassembled views of the exemplary transmission, in accordance with the present disclosure.
Figure 3:
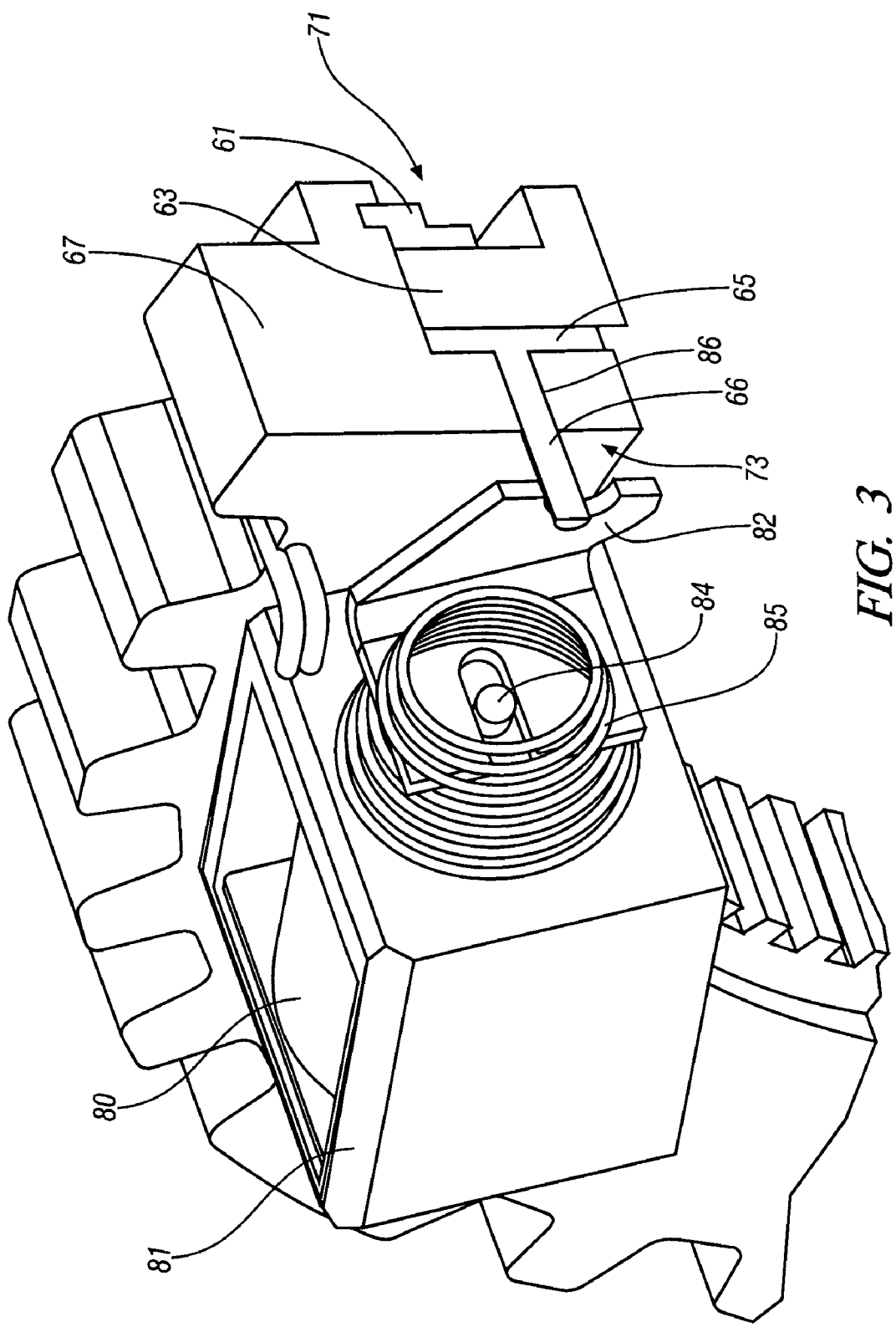
Figure 4:
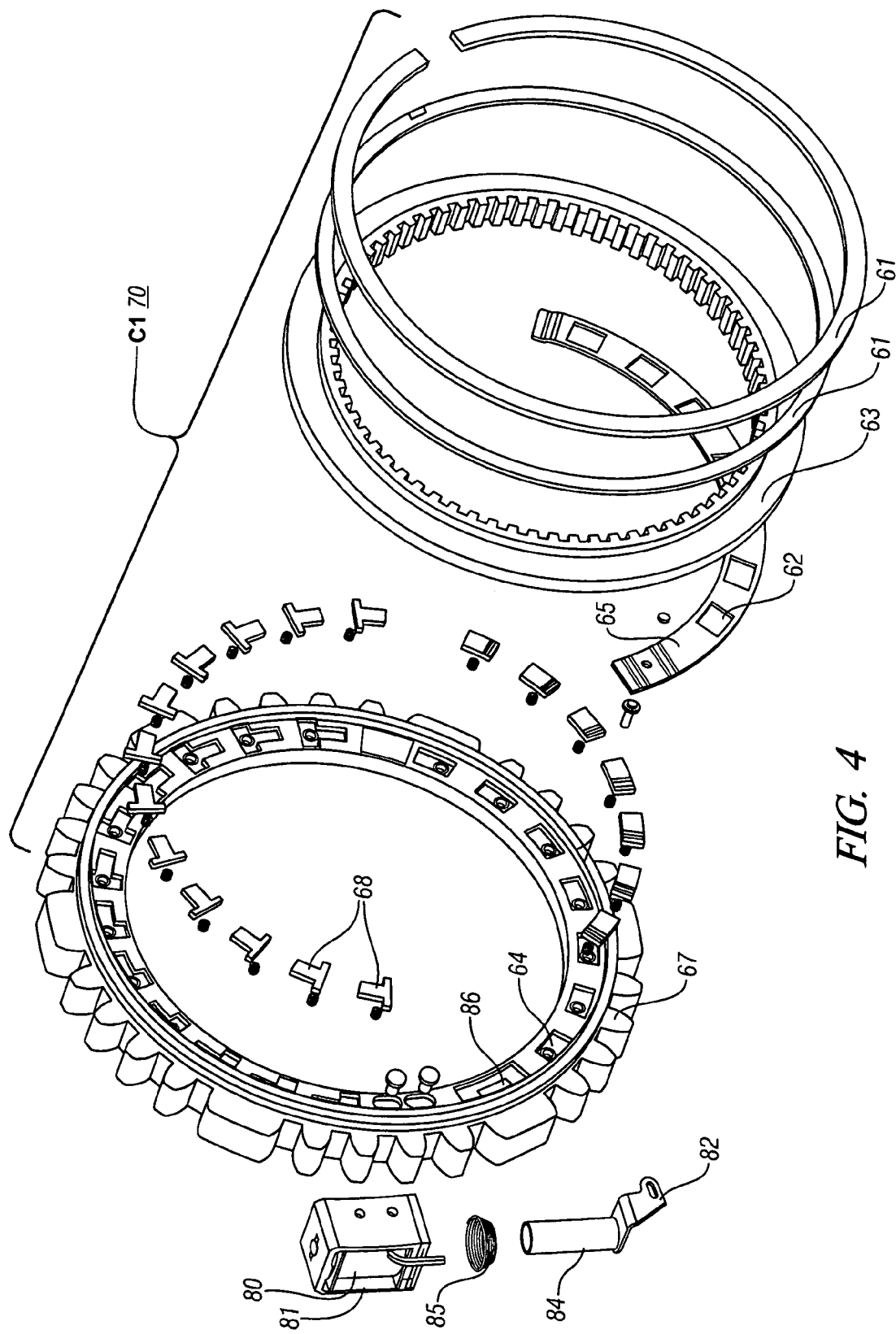

FIGS. 2, 3, and 4 schematically show portions of the transmission 10 including the clutch C1 70 comprising a clutch actuation mechanism for an exemplary SOWC clutch assembly. The exemplary SOWC clutch assembly of clutch C1 70 includes clutch elements comprising an annular strut plate 67 and a co-annular notch plate 63, with a co-annular slide plate 65 interposed therebetween. The clutch actuation mechanism preferably includes the displacement actuator 80 comprising a linear actuator device including an electromagnetically-actuated solenoid, a moveable plunger 84, and a compressible spring 85 placed between a bracket 81 and a yoke device 82 in one embodiment. The displacement actuator 80 fixedly connects to the strut plate 67 via the bracket 81. The displacement actuator 80 including the controllable moveable plunger 84 preferably projects substantially tangential to the annular strut plate 67. The yoke device 82 is connected to a distal end of the moveable plunger 84. The compressible spring 85 is placed between the bracket 81 and the yoke device 82. The yoke device 82 has a radially-oriented longitudinal slot 83 that is configured to engage a pin 66 of the slide plate 65. The displacement actuator 80 in combination with the compressible spring 85 is controllable to move the yoke device 82 to one of a first position (as shown) and a second position (not shown). The yoke device 82 is moved to the first position by applying a retracting force, e.g., actuating the displacement actuator 80. The yoke device 82 is moved to the second position by discontinuing or removing the retracting force applied to the displacement actuator 80, e.g., by deactivating the displacement actuator 80, thus permitting the compressible spring 85 to regain a non-compressed position. In moving the displacement actuator 80 to one of the first position and the second position, the pin 66 drives the slide plate 65 to the corresponding one of the first position and the second position, thus disengaging or engaging the clutch C1 70.

The strut plate 67 has a pocket-shaped design including a first side 71 having a race into which the slide plate 65 and the notch plate 63 are assembled and held in place preferably using at least one retainer ring 61 as best seen in FIG. 3. The strut plate 67 includes a pass-through slot portion 86 formed therein. The pass-through slot portion 86 comprises a circumferentially-oriented elongated opening passing through the strut plate 67 from the first side 71 to a second side 73, and can be located on an annular surface of the strut plate 67, as shown in FIG. 2, and, alternatively, can be located on an outer circumferential surface of the strut plate 67 (not shown). The pin 66 attached to the slide plate 65 passes through the slot portion 86 and slidably moves therein. In one embodiment, there is a plurality of spring-actuated retractable struts 68 located in strut pockets 64 located circumferentially within the pocket area of the first side 71 of the strut plate 67. The notch plate 63 includes a plurality of circumferentially-located notches (not shown) located co-annular to the retractable struts 68 of the strut plate 67. The slide plate 65 is configured to slidably move in the annular race of the strut plate 67, rotating about the common axis. The slide plate 65 includes a plurality of pass-through notch openings 62 corresponding to the retractable struts 68 of the strut plate 67 and the notches of the notch plate 63. The slide plate 65 includes the pin 66 that projects orthogonally from an annular surface of the slide plate 65, and passes through the slot portion 86 of the strut plate 67. The slide plate 65 is configured to rotatably slide within the strut plate 67 about the common axis, with the magnitude of the slidable movement of the slide plate 67 being circumscribed by the movement of the pin 66 and the slot portion 86 of the strut plate 67. When the slide plate 65 rotatably slides to a first position in the strut plate 67, the slide plate 65 is configured to restrain the retractable struts 68, and the notch plate 63 rotates freely with the ring gear 33 of the differential gear set 28. Thus, clutch C1 70 is disengaged. When the slide plate 65 rotatably slides to a second position in the strut plate 67, the notch openings 62 of the slide plate 65 are configured to coincide with the retractable struts 68, allowing them to project therethrough. The retractable struts 68 can engage the notches of the notch plate 63, and fixedly lock the ring gear 33 of the differential gear set 28 to the strut plate 67, stopping it from rotating at least in one direction. Thus, clutch C1 70 can be engaged.

FIG. 3 shows a partial 3D schematic view of the exemplary SOWC clutch assembly of clutch C1 70, including the first side 71 and the second side 73. The exemplary SOWC clutch assembly of clutch C1 70 includes the annular strut plate 67 coaxial to the co-annular slide plate 65 and the co-annular notch plate 63. In the embodiment shown in FIG. 1 the strut plate 67 is fixedly mounted to the transmission case 68, and the co-annular notch plate 63 is fixedly connected to the ring gear 33 of the second differential gear set 28 and rotates therewith. The pin 66 of the slide plate 65 projects through the pass-through slot portion 86 of the strut plate 67.

Figure 5:
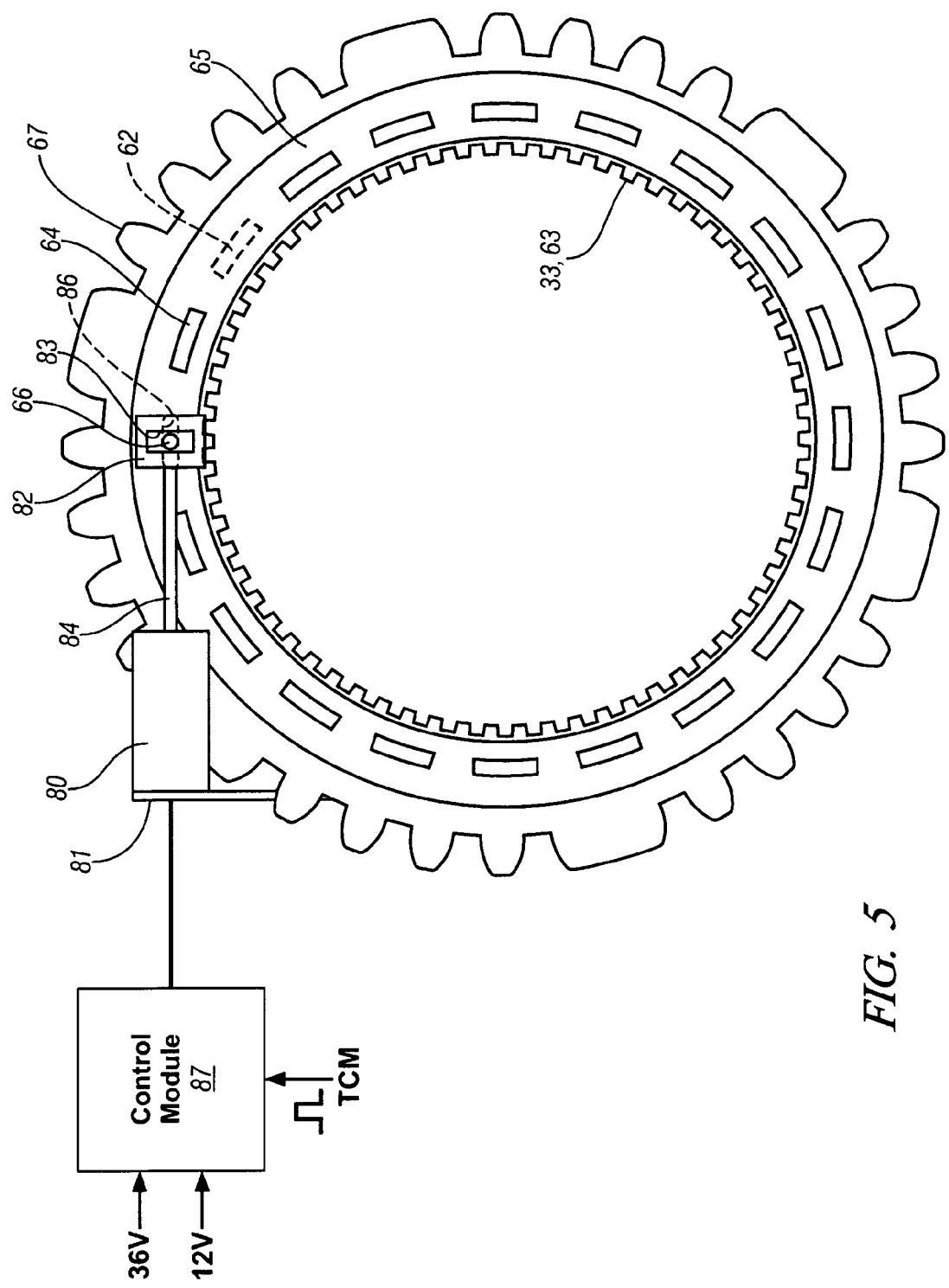
FIG. 5 illustrates a clutch assembly for the exemplary transmission, in accordance with the present disclosure.

FIG. 5 shows a 2D view of the exemplary SOWC clutch assembly of clutch C1 70, including the control module 87 electrically connected to the displacement actuator 80. The control module 87 is illustrated as a single element for ease of description. It should be recognized that the functions performed by the control module 87 may be combined in one or more devices, e.g., implemented in software, hardware, and/or application-specific integrated circuitry (ASIC). Inputs to the control module 87 include a 12 volt power line and a 36 volt power line in one embodiment, and a control signal originating from the TCM 17. The control signal originating from the TCM 17 preferably comprises one of an ON signal, i.e., an actuation signal, and an OFF signal, i.e., a deactivation signal. When the TCM 17 commands the ON signal, i.e., actuation, the control module electrically connects the 36 volt power line to the displacement actuator 80 causing it to retract the plunger 84, thus moving the slide plate 65 to the first position and disengaging the clutch C1 70. The control module 87 can then switch from using the 36 volt power source to using the 12 volt power source, thus reducing electrical load and decreasing response time to subsequently deactivate the displacement actuator 80 allowing the spring 85 to expand and causing the plunger 84 to move to the second position, thus moving the slide plate to the second position and engaging the clutch C1 70. One skilled in the art can conceive of other configurations for engaging and disengaging the exemplary SOWC clutch device C1 70 described herein by actuating and deactivating the displacement actuator 80 using the control module 87.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A clutch assembly configured to transfer torque in a transmission, comprising:
   a selectable one-way clutch comprising a strut plate co-annular to a slide plate and a notch plate;
   the strut plate including a pass-through slot portion and an annular race;
   the slide plate configured to slidably move in the annular race of the strut plate and including a pin fixedly connected to and projecting from the slide plate configured to pass through the slot portion of the strut plate, wherein the slidable movement of the slide plate is limited by the pin and the slot portion of the strut plate;
   a displacement actuator fixedly connected to the strut plate and configured to selectively move the pin and the slide plate to one of a first position and a second position;

the selectable one-way clutch configured to transfer torque between the strut plate and the notch plate in a first direction when the pin and the slide plate are in the first position;

the selectable one-way clutch configured to disengage the strut plate from the notch plate when the pin and the slide plate are in the second position; and a control module configured to actuate the displacement actuator to move the pin and the slide plate from the first position to the second position using a first voltage potential, and configured to hold the displacement actuator in the second position using a second voltage potential less than the first voltage potential.

2. The clutch assembly of claim 1, further comprising the selectable one-way clutch configured to disengage the strut plate from the notch plate when the pin and the slide plate are in the first position and torque is applied between the strut plate and the notch plate in a second direction.

3. The clutch assembly of claim 1, wherein the displacement actuator comprises a linear actuator.

4. A clutch assembly configured to transfer torque in a transmission, comprising:

an annular strut plate co-annular to a slide plate and a notch plate;

the strut plate including a pass-through slot portion, an annular race, and a plurality of circumferentially-located retractable struts;

the notch plate including a plurality of circumferentially-disposed notches located co-annular to the retractable struts of the strut plate;

the slide plate configured to slidably move in the annular race of the strut plate and including a pin projecting from a surface of the slide plate configured to pass through the slot portion of the strut plate, wherein the slidable movement of the slide plate is limited by the pin and the slot portion of the strut plate;

the slide plate including a plurality of pass-through notch openings corresponding to the retractable struts and the strut plate;

a linear actuator having a moveable plunger projecting substantially tangential to the annular race wherein a distal end of the moveable plunger comprises a yoke device configured to engage the pin of the slide plate, the linear actuator controllable to move the yoke device to one of a first position and a second position;

the retractable struts configured to engage the co-annular notches of the notch plate when the yoke device is in the first position and the retractable struts configured to retract within the strut plate and disengage the co-annular notches of the notch plate when the yoke device is in the second position; and a control module configured to actuate the linear actuator to move the pin and the slide plate from the first position to the second position using a first voltage potential, and configured to hold the linear actuator in the second position using a second voltage potential less than the first voltage potential.

* * * * *